United States Patent [19]
Waisala et al.

[11] Patent Number: 4,868,142
[45] Date of Patent: Sep. 19, 1989

[54] METHOD OF MANUFACTURING A MOLTEN METAL-RESISTANT CERAMIC FIBER COMPOSITION

[75] Inventors: Steven J. Waisala, Aurora; Ajit Y. Sane, Medina, both of Ohio

[73] Assignee: Stemcor Corporation, Cleveland, Ohio

[21] Appl. No.: 133,898

[22] Filed: Dec. 16, 1987

[51] Int. Cl.⁴ .................. C04B 35/80; C04B 35/18
[52] U.S. Cl. ........................ 501/85; 501/95; 501/128; 264/60; 264/63; 264/66; 264/43
[58] Field of Search .................. 501/35, 95, 128; 264/60, 63, 66, 43

[56] References Cited

U.S. PATENT DOCUMENTS

| | | | |
|---|---|---|---|
| 2,997,402 | 8/1961 | McDonald et al. | 501/127 |
| 3,077,413 | 2/1963 | Campbell | 264/60 |
| 3,096,144 | 7/1963 | Wainer et al. | 106/18.14 |
| 3,231,401 | 1/1966 | Price et al. | 502/241 |
| 3,269,849 | 8/1966 | Caprio et al. | 501/124 |
| 3,471,306 | 10/1969 | Rubin et al. | 501/35 |
| 3,607,608 | 9/1971 | Siefert | 501/125 |
| 4,144,195 | 3/1979 | Siebels | 501/105 |
| 4,194,914 | 3/1980 | Moriya et al. | 264/65 |
| 4,257,812 | 3/1981 | Johnson et al. | 501/127 |
| 4,314,852 | 2/1982 | Brennan et al. | 501/88 |
| 4,331,773 | 5/1982 | Hongo et al. | 501/128 |
| 4,379,111 | 4/1983 | Smith et al. | 264/137 |
| 4,510,253 | 4/1985 | Felice | 501/95 |
| 4,551,295 | 11/1985 | Gardner et al. | 264/60 |
| 4,612,240 | 9/1986 | Johnson et al. | 428/289 |
| 4,640,899 | 2/1987 | Hillig et al. | 501/95 |
| 4,650,775 | 3/1987 | Hill | 501/95 |
| 4,673,658 | 1/1987 | Gadkaree et al. | 264/60 |
| 4,690,790 | 9/1987 | Bates | 501/92 |

FOREIGN PATENT DOCUMENTS

| | | |
|---|---|---|
| 894506 | 4/1962 | United Kingdom . |
| 2168338 | 6/1986 | United Kingdom . |

OTHER PUBLICATIONS

"Methocel TM" Advertisement, *Ceramic Industry*, vol. 130, No. 1, Jan. 1988, Corcoran, Solon, OH.

*Primary Examiner*—William R. Dixon, Jr.
*Assistant Examiner*—David M. Brunsman
*Attorney, Agent, or Firm*—Weston, Hurd, Fallon, Paisley & Howley

[57] ABSTRACT

A method of manufacturing a molten metal-resisting ceramic fiber composition includes mixing ceramic fibers, a frit, ceramic additives, a low temperature binder, and water. The mixture is formed into a desired shape, preferably by being extruded through a die. The shaped mixture is baked at low temperature, and then is fired at high temperature. During firing, the low temperature binder is oxidized and the frit is melted so as to substantially coat the fibers and fuse them into a porous matrix.

32 Claims, No Drawings

METHOD OF MANUFACTURING A MOLTEN METAL-RESISTANT CERAMIC FIBER COMPOSITION

BACKGROUND OF THE INVENTION

1. Field of the Invention

The invention relates to molten metal-resistant compositions and, more particularly, to a method of manufacturing a molten metal-resistant composition employing ceramic fibers.

2. Description of the Prior art

In the casting of molten metals such as aluminum, copper, zinc, and the like, and alloys thereof, the metal generally is melted in a furnace and thereafter is transported through various transfer systems to a mold where solidification occurs. In a typical arrangement, molten metal is transferred from the furnace to a ladle and thence to a holding furnace. From the holding furnace the metal is dispensed to individual molds through a gating system employing pipes and troughs.

In order to transport the metal as described, it is necessary that the various ladles, pipe, troughs, and the like (transport elements) be protected from chemical and mechanical attack by the metal. It also is necessary that the transport elements be insulated so that the metal remains in a liquid state until solidification is desired. In response to the foregoing requirements, it has become conventional practice to provide protective liners for the transport elements. The liners desirably are of low density so that a proper insulating function is provided, but they also must have enough chemical and structural integrity to withstand attack by the metal. Transport elements that include a high percentage of ceramic fibers such as aluminosilicate fibers have been found to perform better than transport elements employing other constituents. Although ceramic fibers are subject to attack by molten metal, particularly aluminum, these fibers have been found to exhibit the best combination of insulating properties and structural integrity. Unfortunately, the techniques used to manufacture transport elements employing a high percentage of aluminosilicate fibers have certain limitations.

The most commonly used technique for forming transport elements from ceramic fibers is that of vacuum forming. In vacuum forming, a slurry consisting of water, ceramic fibers, and binders (usually a low temperature, organic binder and a high temperature, inorganic binder) is mixed in a tank. A metal mesh, or gauze, of a desired configuration is immersed in the slurry and a vacuum is applied to the mesh. Water is sucked through the mesh but solid constituents in the slurry are retained on the surface of the mesh. The vacuum is stopped when a required thickness has been deposited on the mesh. The now-formed part is removed and dried. After drying, the part can be fired at high temperature to burn out the low temperature, organic binder.

The vacuum forming process has a number of drawbacks. One of these drawbacks is that the process is a batch process, that is, only a limited number of mesh forms can be immersed in the slurry at a given time, and additional parts cannot be made until previous parts are completed. Additionally, the process can produce only parts having a uniform cross-section. If differing wall thicknesses are required, a separate machining operation is necessary. Also, it is not possible to produce articles having a length greater than about four feet. Another drawback of the vacuum forming process is that it is difficult to control the thickness of the resultant parts. Trial and error experimentation is required to approximate the desired thickness, and variations can occur from batch to batch depending upon such things as variations in the slurry, the strength of the vacuum, the length of time the vacuum is applied, and so forth.

Another technique for forming transport elements is that of lamination. In the lamination technique, layers of ceramic fiber "paper" are wrapped around a shape such as a mandrel. After enough layers have been applied, a desired wall thickness will be obtained. The principal drawback of the lamination process is that considerable effort is required to apply the paper layers properly. The technique is exceedingly difficult and time consuming to accomplish. It also is of limited usefulness in that articles having only certain shapes, such as cylinders, are amenable to manufacture by the process.

Yet an additional technique for manufacturing transport elements is that of molding. In the molding process, a thick fiber mixture is deposited into a mold. The mixture is tamped or shaped by hand to fill all parts of the mold. The molding technique is even more labor intensive than the lamination technique, and therefore is even less desirable.

Another approach is disclosed in U.S. Pat. No. 4,257,812. In the '812 patent, aluminosilicate fibers, kaolin clay, plasticizers, water, and lubricants are mixed together and then are extruded into a desired shape. Thereafter, the shape is dried to remove so-called mechanical water, and thereafter is fired at elevated temprature to drive off so-called chemical water and transform the kaolin clay into the metakaolin phase. Although the extrusion process disclosed in the '812 patent offers certain advantages over certain other processes such as the lamination and molding processes, it fails to address certain concerns. One of those concerns relates to the firing temperature. If the firing temperature inadvertently should exceed approximately 1800° F., the metalkaolin will abruptly decompose and form alumina, mullite, and free silica, substances of no use in protecting against attack by molten metal. Even an inadvertent, temporary firing at approximately 1800° F. will ruin the extruded shapes.

An additional problem relates to the density of the extruded product. In order to obtain desirable insulating properties, the extruded product should have a low density on the order of 35–45 lbs. per cubic foot. However, the density of the resultant product disclosed in the '812 patent is on the order of 95–100 lbs. per cubic foot. This is believed to be caused by a relatively small percentage of water used to produce an extrudable mixture.

Desirably, a process for manufacturing molten metal-resistant ceramic fiber compositions would be available that would yield products having a lower density than products produced by prior extrusion processes. The process also hopefully would have advantages over prior possesses such as vacuum forming, including better dimensional tolerances, the capability of producing products having longer lengths and variable wall thicknesses, and improved manufacturability.

SUMMARY OF THE INVENTION

In response to the foregoing concerns, the present invention provides a new and improved method for manufacturing a molten metal-resistant ceramic fiber composition. The method according to the invention involves providing a glassy frit that is resistant to attack by molten metals. A preferred frit consists essentially of calcium oxide, aluminum oxide, and boron oxide (the "C-A-B frit"). The frit is dry-mixed with ceramic fibers such as alumino-silicate fibers and a low temperature binder such as methylcellulose ether, and the mixture thereafter is combined with water to form a homogeneous mixture. Alternatively, the frit is mixed with the binder and thereafter mixed with water to form a gel, or the binder is mixed with water and the frit thereafter is added to form a gel. After the gel has been formed, ceramic fibers are stirred into the mixture until a putty-like consistency is obtained. Various additives can be included in the mixture, if desired, to control secondary functions such as erosion resistance, thermal shock resistance, refractoriness, corrosion resistance, manufacturability, and so forth.

After the mixture has been processed as noted above, it is formed into a desired shape by any known technique such as molding or extruding. In the preferred embodiment, extruding is employed because it is a very economical process and it is believed that the fibers are more completely coated by the frit. Extruding also enables high linear speeds on the order of 10-40 feet per minute to be attained. After the mixture has been formed into the desired shape, it is dried at low temperature to drive off so-called mechanical water and then is fired at high temperature to oxidize the binder, drive off chemical water, and melt the frit. The melted frit substantially coats the fibers and bonds them together into a porous matrix. After cooling, the now-formed article is ready for use. A typical fired composition has about 30-80 percent by weight of alumino-silicate fibers, 10-50 percent by weight of C-A-B frit, and 0-50 percent by weight of one or more ceramic additives.

Compositions according to the invention have been found to be exceedingly resistant to attack by molten metals, particularly aluminum, while also having highly effective insulating properties. These results are believed to arise in part from the substantial avoidance of constituents such as colloidal silica that function as the primary high temperature binder. Also, it is believed that extruding the frit-fiber mixture causes the fibers to be coated more effectively than is possible with other manufacturing techniques. Accordingly, the fibers are protected better so that the useful life of the resultant product is enhanced. The present invention has other advantages compared with prior processes such as vacuum forming, including better dimensional tolerances, the capability of producing products having longer lengths and variable wall thicknesses, and improved manufacturability.

A feature of the invention relates to the nature of the ceramic fibers. It has been discovered that fibers having a small average means diameter will absorb more water than larger fibers, and further that such small-diameter fibers will yield a lower density product than large-diameter fibers. By using small-diameter fibers, approximately twice the water is required to produce an extrudable mixture, with a corresponding decrease in density of the finished product.

The foregoing and other features and advantages, and a thorough understanding of the invention, may be had by referring to the following description and claims.

DESCRIPTON OF THE PREFERRED EMBODIMENT

The composition according to the invention is especially adapted to be used as a liner for transport elements used in the casting of non-ferrous molten metals such as aluminum and aluminum alloys, although it can be used in any application where non-ferrous molten metals are stored or transported. Typical applications include pipe liners, sleeves, troughs, launders, ladles, ladle liners, floates, downspouts, headers, casting rings, and the like. The composition according to the invention can be shaped while wet into any desired configuration by such techniques as molding or extruding. After the shapes have been dried at low temperature and fired at high temperature, the resultant articles are ready for use.

The composition according to the invention comprises the following materials by weight percent after firing:

30-80 percent of ceramic fibers;
10-50 percent of a frit; and
0-50 percent of one or more ceramic additives.

Before firing, the composition also includes water and a low temperature organic binder such as hydroxypropyl methylcellulose or methylcellulose ether. The individual components of the composition and the preparation of the composition will be described below.

THE CERAMIC FIBERS

The ceramic fibers are light, fluffy fibers that have excellent refractory characteristics. The fibers also are excellent insulators because they are poor heat conductors, and because they are of low density.

In the preferred embodiment, the fibers are alumino-silicate fibers, preferably shot-free HSA fiber, commercially available from The Standard Oil Engineered Materials Company, Fiber Division, Niagara Falls, New York. HSA fiber is an alumino-silicate fiber having a composition of approximately 50 percent aluminum and 50 percent silica, an average mean diameter of about 1.2 microns, and a length of 0.125 inch or less. Compared to other ceramic fibers having higher alumina contents, HSA fiber is quite inexpensive. The absence of shot (non-fiber, high density particles) ensures that the finished product will be of lowest possible density and that all constituents will be in a physical form most likely to be coated by the frit.

Fibers other than HSA fiber can be used in the composition, if desired. For example, Fiberfrax 6000 chopped alumino-silicate fibers having an average mean diameter of about 2-3 microns and a length of 0.125-0.25 inch can be used. Fibers having a length longer than ½ inch also can be used, although it is expected that any fibers over 0.125 inch will be reduced in length during the mixing process.

It is desirable that whatever fiber are used have a small average mean diameter within the range of about 1.0-3.0 microns so as to have a large surface area capable of absorbing large quantities of water during mixing; the resultant products will have a lower density. By way of example, HSA fibers have a surface area of about 2.5 $m^2$/gram, whereas Fiberfrax 600 fibers have a surface area of about 0.25 $m^2$/gram. HSA fibers require almost twice as much water as Fiberfrax 6000 fibers in order to achieve a comparable viscosity of the mixed product. After firing, the product containing HSA fibers is less dense than one containing Fiberfrax 600 fibers.

THE FRIT

The frit, when employed as part of the present invention, is melted so as to stubstantially coat the ceramic fibers. The frit also is a high temperature binder that bonds the fibers together into a porous matrix. The frit is highly resistant to attack by molten metal, particularly aluminum, and, if the fibers have been substantially coated, the fibers will be protected from attack. The frit also is non-wetting to molten metal. Regardless of the metal being handled, the frit must resist reacting with metal oxides or, if a reaction occurs, the reformed frit must maintain a high melting point.

A preferred frit is the so-called C-A-B frit consisting essentially of calcium oxide, aluminum oxide, and boron oxide. The C-A-B frit can be prepared by mixing finely divided calcium carbonate, finely divided alumina, and finely divided boric acid and heating the mixture so as to fuse it and cause a reaction which forms a homogenous, glassy product. Complete details for preparation of the C-A-B frit as disclosed in U.S. Pat. No. 2,997,402 (the '402 patent), the disclosure of which is incorporated herein by reference. As noted in more detail in the '402 patent, the fused glassy product is cooled and comminuted to pass through a 100 mesh screen. The comminuted, screened product is suitable for use in preparation to the composition according to the invention.

The C-A-B frit also can be purchased from Ferro Corp., Coatings Division, 4150 East 56th Street, Cleveland, Ohio 44101, product designation Leadless Frit, XF-150.

THE LOW TEMPERATURE BINDER

The low temperature binder is used during preparation of the composition to hold the constituents of the composition together during the mixing process, to provide green strength after forming, and to assist in preventing cracks upon firing. Although a variety of organic materials can function adequately as a binder, hydroxypropyl methylcellulose has been found to be an effective binder. Methylcellulose ether also has been found to be especially effective. Methylcellulose ether is a water-soluble polymer which functions as a performance additive in masonry cement systems.

Methylcellulose ether is commercially available under the trademark METHOCEL from the Dow Chemical Company, Specialty Chemicals Department, Midland, Michigan 48640. METHOCEL methylcellulose ether is available in various grades and degrees of viscosity, and the grade designations 20-213, 20-214, 20-231, and K4MS have been found to be suitable for practicing the present invention. The grade designation 20-231 is preferred. As supplied, METHOCEL methylcellulose ether is a white or off-white powder having a specific gravity of 1.39 grams per cc.

THE CERAMIC ADDITIVES

Various ceramic additives can be added to the composition to perform secondary functions. Such secondary functions include modification of thermal, electrical, corrosion, and wetting properties of the resultant product. It also may be desirable to provide an inexpensive filler material for certain applications. Another secondary function is that of process control, that is, an additive which enables the composition to be prepared earlier. Suitable examples are set forth below.

Boehmite (alpha-alumina monohydrate), colloida silica, colloidal alumina, or aluminum oxide can be used as a secondary binder to provide support during firing. The use of these substances tends to prevent slumping of shaped articles during firing.

Silicon carbide, silicon nitride, aluminum nitride, spinel, zircon, zirconia, zirconia-toughened alumina, magnesia, calcium aluminate, alumina-coated silica, or titanium diboride can be added to the composition to improve erosion resistance thermal shock resistance, refractoriness, and corrosion resistance in molten metals.

Bubble alumina can be added to the composition as a low density filler.

The ceramic additives can be used alone, or in combination. For example, a small amount of boehmite or colloidal silica could be used to provide support during firing, while a larger amount of silicon carbide could be used to enhance erosion resistance. The additives that should be used depend upon the properties that are desired in the fired product. Those skilled in the art will be aware of the additives that will be required to produce a fired product best suited to their needs, and further discussion here is unnecessary.

PREPARING THE MIXTURE

The equipment needed to prepare the mixture is a mixer such as a Hobart mixer, a scale, and plastic containers. The following steps are performed:

1. The frit is prepared as noted above. The low temperature binder, frit, ceramic fibers, and additives, if any, are dry-blended until thoroughly mixed.

2. Water is added to the mixture while stirring.

3. Mixing is continued until a homogeneous mixture is attained.

4. The mixture is formed into a desired shape by any desired technique such as hand forming, press molding, or extruding. In preferred practice, the mixture is extruded because extrusion is a very economical process and is believed to produce the best coating of the fibers by the binder frit mixture.

5. After the articles have been formed, they are dried at low temperature in order to drive off water not held by chemical bond ("mechanical water"). A preferred drying schedule is about 12 hours at about 100°–120° C.

6. After drying, the articles are fired at high temperature in order to oxidize the binder, drive off water held in chemical bond ("chemical water"), and fuse the frit. A preferred firing schedule is 10 hours from 25° C. to 1050° C., hold 2 hours at 1050° C., and 6 hours from 1050° C. to 25° C. Other firing schedules can be practiced, providing the foregoing objectives are attained.

7. After firing, the articles are ready for use.

Alternative mixing steps are possible. For example, rather than dry-blending all of the non-liquid ingredients, the low temperature binder can be mixed with water and then the frit can be added until gelling occurs. Thereafter, the fibers and any additives can be added until a putty-like consistency is obtained. It also is possible to dry-blend the low temperature binder and the frit and then to add water until a gel forms. The fibers and additives can be mixed with water prior to being added to the gel.

EXAMPLES

Although a preferred embodiment has been described, the composition according to the invention and its method of manufacture will be described by reference to various examples.

EXAMPLE A 17.5 grams of METHOCEL K4MS methylcellulose ether were added to 219 cc of cold water while stirring. Then, 56.4 grams of C-A-B frit was added to the binder-water mixture while stirring continued. Within several minutes the solution began to gel due to pH change brought about by the addition of the frit. 195 grams of the gel than was mixed with 40 grams of shot-free HSA ceramic fiber until a putty-like consistency was obtained. The mixture was molded into the form of a cup and dried at 100° C. overnight. After drying, the article was fired in a kiln to melt the frit using the following schedule: 10 hours from 25° C. to 1050° C., hold 2 hours to 1050° C., and 6 hours from 1050° C. to 25° C. Upon removing the cup from the kiln, the cup had good strength and a strong, hard surface.

The cup was filled with molten aluminum at approximately 1500° F. and placed in a furnace at 1500° F. for 48 hours. The metal was poured from the cup leaving a thin skin on the inside walls. When cooled, the skin peeled easily, showing no sign of attack by the molten aluminum.

EXAMPLE B 9 rams of METHOCEL methylcellulose ether were added to 137 cc of cold tap water while stirring. 30 grams of alumina and 15 grams of C-A-B frit were dry-blended and then added to the binder-water mixture while stirring. Within a few minutes the solution began to gel, whereupon 96 grams of the gelled solution was mixed with 20 grams of HSA ceramic fiber. After a uniform mixture was obtained, it was molded into a small cup, dried and fired using the schedule set forth in Example A. After testing as noted in Example A, the cup was found to shown no sign of attack by the molten aluminum.

EXAMPLE C 30 grams of C-A-B frit were dry-bleached with 4.5 grams of METHOCEL methylcellulose ether for 20 minutes. The blended mixture than was added to 90 cc of cold water while agitating. Once the solution gelled, 41.5 grams of the solution was blended with 20 grams of HSA ceramic fiber, together with 45 grams of a 5 percent METHOCEL-water gel prepared earlier. The formulation was ram-extruded into 0.25 inch diameter rods using a die and piston on a hydraulic press. The extruded rods were dried and fired using the drying and firing schedule of Example A.

EXAMPLE D 20 grams of C-A-B frit were dry-blended with 4.5 grams of METHOCEL methycellulose ether for 20 minutes. The dry-blended mixture then was added to 90 cc of cold water while stirring until gelling occurred. 15 cc of water were dispersed in 20 grams of HSA ceramic fiber, and 38.2 grams of the C-A-B frit-binder gel as prepared above were added to the fibers. Also, 35 grams of a 5 percent methylcellulose ether-water gel prepared earlier were added to the mixture. The formulation was ram-extruded into 0.25 inch diameter rods using a die and piston on a hydraulic press. The rods were dried and fired using the drying and firing schedule of Example A.

EXAMPLE E 400 grams of HSA ceramic fiber, 160 grams of C-A-B frit, and 78 grams of METHOCEL methylcellulose ether were dry-blended. 700 grams of a mixture consisting of 13 percent boehmite, 1 percent acetic acid, and 86 percent water was added to the dry-blended ingredients while stirring. Then, 315 grams of water were added to the mixture.

The formulation was ram-extruded to form a hollow tube having an outer diameter of 2.5 inches and an inner diameter of 1.5 inches. The tube was dried and fired using the drying and firing schedule of Example A. The tube was immersed in pure molten zinc at 500° C. for about 2½ days with no evidence of any corrosion of the tube. The tube also prepared to be non-wetted by the zinc.

The following table shows the product formulation of the various Examples:

| Example | Ingredients | Weight % Wet | Weight % After Baking | Weight % After Firing |
|---|---|---|---|---|
| A | Ceramic fiber | 17.02 | 44.84 | 51.57 |
|   | C-A-B frit | 15.98 | 42.11 | 48.43 |
|   | METHOCEL binder | 4.95 | 13.05 | |
|   | Water | 62.04 | | |
| B | Ceramic Fiber | 17.24 | 42.42 | 46.92 |
|   | C-A-B frit | 13.0 | 31.99 | 35.39 |
|   | $Al_2O_3$ | 6.5 | 15.99 | 17.69 |
|   | METHOCEL binder | 3.9 | 9.6 | |
|   | Water | 59.36 | | |
| C | Ceramic fiber | 18.85 | 59.47 | 66.89 |
|   | C-A-B frit | 9.33 | 29.44 | 33.11 |
|   | METHOCEL binder | 3.52 | 11.09 | |
|   | Water | 68.30 | | |
| D | Ceramic fiber | 18.49 | 66.84 | 74.99 |
|   | C-A-B frit | 6.17 | 22.29 | 25.01 |
|   | METHOCEL binder | 3.0 | 10.86 | |
|   | Water | 72.34 | | |
| E | Ceramic fiber | 24.20 | 54.87 | 61.44 |
|   | C-A-B frit | 9.68 | 21.95 | 24.58 |
|   | Boehmite | 5.50 | 12.48 | 13.98 |
|   | METHOCEL binder | 4.72 | 10.70 | |
|   | Acetic acid | .42 | | |
|   | Water | 55.47 | | |

In addition to demonstrating excellent resistance to attack by molten metal, articles prepared according to the invention have a low density characteristic of products made from ceramic fibers. The density of the finished articles will depend upon the type of fibers and upon the exact percentage of fibers, frit and additives used in the mixture. The following approximate densities without additives were measured on articles produced by extrusion:

| Percentage of Fiber to Frit | Density (lbs. per cubic ft.) |
|---|---|
| 75:25 | 27 |
| 66⅔:33⅓ | 36 |
| 55:45 | 42 |

Although the invention in its preferred embodiment has been described with a certain degree of particularity, it will be appreciated that various changes and modifications can be made. Accordingly, it is intended that the patent shall cover, by suitable expression in the appended claims, all such changes and modifications that fall within the true spirit and scope of the invention.

It also is intended that the patent shall cover all features of patentable novelty which exist in the invention disclosed.

What is claimed is:

1. A method for producing a molten metal-resistant ceramic fiber composition, comprising the steps of:
   providing a frit of CaO, $Al_2O_3$, and $B_2O_3$;
   providing a low temperature organic binder;
   mixing the low temperature organic binder with the frit;
   providing alumino-silicate ceramic fibers having an average mean diameter of about 1.2 microns;
   mixing the binder-frit mixture with the fibers;
   adding water to the binder-frit-fiber mixture;
   forming the binder-frit-fiber mixture into a desired shape;
   drying the binder-frit-fiber mixture; and
   firing the binder-frit-fiber mixture to oxidize the binder and melt the frit.

2. The method of claim 1, wherein the low temperature organic binder is selected from the group consisting of hydroxypropyl methylcellulose and methylcellulose ether.

3. The method of claim 1, wherein the step of providing the frit includes the steps of:
   mixing finely divided calcium carbonate, finely divided alumina, and finely divided boric acid;
   heating the mixture to cause it to fuse and form a homogeneous, glassy product;
   cooling the product; and
   comminuting the product.

4. The method of claim 1, wherein the step of mixing the low temperature organic binder includes mixing the binder with water and stirring the mixture, and thereafter mixing the frit with the binder-water mixture until a gel forms.

5. The method of claim 1, wherein the step of mixing the low temperature organic binder includes mixing the binder and the frit while dry and thereafter adding water and stirring until a gel forms.

6. The method of claim 1, wherein the step of forming constitutes extruding.

7. The method of claim 1, wherein the step of drying includes heating at about 100°–120° C. for about 12 hours.

8. The method of claim 1, wherein the step of firing includes heating at about 1050° C. for about 2 hours.

9. The method of claim 1, further including the step of mixing one or more ceramic additives with the binder-frit-fiber mixture prior to carrying out the step of forming the binder-frit-fiber mixture into a desired shape.

10. The method of claim 9, wherein the additives are selected from the group consisting of boehmite, alumina, colloidal, silica, silicon carbide, silicon nitride, aluminum nitride, spinel, zircon, zirconia, magnesia, calcium aluminate, alumina-coated silica, and titanium diboride.

11. The method of claim 1, wherein the ceramic fibers consist of approximately 50 percent alumina and 50 percent silica.

12. A method for producing a molten metal-resistant ceramic fiber composition, comprising the steps of:
   providing a frit of CaO, $Al_2O_3$, and $B_2O_3$;
   providing a low temperature organic binder selected from the group consisting of hydroxypropyl methylcellulose and methylcellulose ether;
   mixing the low temperature organic binder with the frit;
   providing alumino-silicate fibers having an average means diameter of about 1.2 microns;
   mixing the binder-frit mixture with the aluminosilicate fibers;
   adding water to the binder-frit-binder mixture;
   extruding the binder-frit-fiber mixture into a desired shape;
   drying the binder-frit-fiber mixture; and
   firing the binder-frit-fiber mixture to oxidize the binder and melt the frit.

13. The method of claim 12, wherein the step of providing a frit includes the steps of:
   mixing finely divided calcium carbonate, finely divided alumina, and finely divided boric acid;
   heating the mixture to cause it to fuse and form a homogeneous, glassy product;
   cooling the product; and
   comminuting the product.

14. The method of claim 12, wherein the step of mixing the low temperature organic binder includes mixing the binder with water and stirring the mixture, and thereafter mixing the frit with the binder-water mixture until a gel forms.

15. The method of claim 12, wherein the step of mixing the low temperature organic binder includes mixing the binder and the frit while dry and thereafter adding water and stirring until a gel forms.

16. The method of claim 12, wherein the step of drying includes heating at about 100°–120° C. for about 12 hours, and the step of firing includes heating at about 1050° C. for about 2 hours.

17. The method of claim 12, further including the step of mixing one or more ceramic additives with the binder-frit-fiber mixture prior to carrying out the step of forming the binder-frit-fiber mixture into a desired shape.

18. The method of claim 17, wherein the additives are selected from the group consisting of boehmite, alumina, colloidal silica, silicon carbide, silicon nitride, aluminum nitride, spinel, zircon, zirconia, magnesia, calcium aluminate, alumina-coated silica, and titanium diboride.

19. The method of claim 8, wherein the step of firing includes cooling from about 1050° C. to about 25° C. over a period of about six hours.

20. The method of claim 12, wherein the step of firing includes heating at about 1050° C. for about two hours and cooling from about 1050° C. to about 25° C. over a period of about six hours.

21. A method for producing a molten metal-resistant ceramic fiber composition, compromising the steps of:
   providing a frit of CaO, $Al_2O_3$, and $B_2O_3$;
   providing a low temperature organic binder;
   mixing the low temperature organic binder with the frit;
   providing alumino-silicate ceramic fibers;
   Adding water to the binder-frit-fiber mixture
   mixing the binder-frit-fiber mixture;
   forming the binder-frit-fiber mixture into a desired shape;
   drying the binder-frit-fiber mixture;
   firing the binder-frit-fiber mixture at about 1050° C. for about 2 hours to oxidize the binder and melt the frit; and
   cooling the binder-frit-fiber mixture from about 1050° C. to about 25° C. over a period of about 6 hours.

22. The method of claim 21, wherein the low temperature organic binder is selected from the group consisting of hydroxypropyl methylcellulose and methylcellulose ether.

23. The method of claim 21, wherein the step of providing the frit includes the steps of:
mixing finely divided calcium carbonate, finely divided alumina, and finely divided boric acid,
heating the mixture to cause it to fuse and form a homogeneous, glassy product;
cooling the product; and
comminuting the product.

24. The method of claim 21, wherein the step of mixing the low temperature organic binder includes mixing the binder with water and stirring the mixture, and thereafter mixing the frit with the binder-water mixture until a gel forms.

25. The method of claim 21, wherein the step of mixing the low temperature organic binder includes mixing the binder and the frit while dry and thereafter adding water and stirring until a gel forms.

26. The method of claim 21, wherein the step of forming constitutes extruding.

27. The method of claim 21, wherein the step of drying includes heating at about 100-120° C. for about 12 hours.

28. The method of claim 21, further including the step of mixing one or more ceramic additives with the binder-frit-fiber mixture prior to carrying out the step of forming the binder-frit-fiber mixture into a desired shape.

29. The method of claim 28, wherein the additives are selected from the group consisting of boehmite, alumina, colloidal silica, silicon carbide, silicon nitride, aluminum nitride, spinel, zircon, zirconia, magnesia, calcium aluminate, alumina-coated silica, and titanium diboride.

30. The method of claim 21, wherein the ceramic fibers consist of approximately 50 percent alumina and 50 percent silica.

31. The method of claim 21, wherein the ceramic fibers have an average mean diameter within the range of about 1.0-3.0 microns.

32. The methgod of claim 31, wherein the ceramic fibers have an average mean diameter of about 1.2 microns.

* * * * *